(12) United States Patent
Nyuu et al.

(10) Patent No.: US 10,596,781 B2
(45) Date of Patent: Mar. 24, 2020

(54) STRUCTURE HAVING SOLID PARTICLES DISTRIBUTED ON THE SURFACES THEREOF

(71) Applicants: TOYO SEIKAN CO., LTD., Tokyo (JP); TOYO SEIKAN GROUP HOLDINGS, LTD., Tokyo (JP)

(72) Inventors: Keisuke Nyuu, Yokohama (JP); Yoshiaki Okada, Yokohama (JP); Tomoyuki Miyazaki, Yokohama (JP); Yosuke Akutsu, Yokohama (JP); Shinya Iwamoto, Yokohama (JP)

(73) Assignees: TOYO SEIKAN CO., LTD., Tokyo (JP); TOYO SEIKAN GROUP HOLDINGS, LTD., Tokyo (JP)

( * ) Notice: Subject to any disclaimer, the term of this patent is extended or adjusted under 35 U.S.C. 154(b) by 218 days.

(21) Appl. No.: 15/567,824

(22) PCT Filed: Mar. 18, 2016

(86) PCT No.: PCT/JP2016/058708
§ 371 (c)(1),
(2) Date: Oct. 19, 2017

(87) PCT Pub. No.: WO2016/170882
PCT Pub. Date: Oct. 27, 2016

(65) Prior Publication Data
US 2018/0134004 A1    May 17, 2018

(30) Foreign Application Priority Data
Apr. 24, 2015   (JP) .................................. 2015-089464

(51) Int. Cl.
*B32B 5/30*      (2006.01)
*B32B 3/14*      (2006.01)
(Continued)

(52) U.S. Cl.
CPC .................. *B32B 5/30* (2013.01); *B32B 3/14* (2013.01); *B32B 17/06* (2013.01); *B32B 27/06* (2013.01);
(Continued)

(58) Field of Classification Search
CPC .... B65D 1/0207; B65D 1/0246; B65D 65/42; B65D 85/72; B65D 23/02; B32B 3/14; B32B 17/06; B32B 27/08; B32B 2439/60
See application file for complete search history.

(56) References Cited

U.S. PATENT DOCUMENTS 4,866,026 A     9/1989   Henzel et al.
10,131,804 B2 * 11/2018  Okada .................... B32B 17/06
(Continued)

FOREIGN PATENT DOCUMENTS

EP     2873630 A1    5/2015
EP     3025852 A1    6/2016
(Continued)

OTHER PUBLICATIONS

Communication dated Oct. 24, 2018, from Korean Intellectual Property Office in counterpart application No. 10-2017-7028072.
(Continued)

*Primary Examiner* — Michael C Miggins
(74) *Attorney, Agent, or Firm* — Sughrue Mion, PLLC

(57) ABSTRACT

A structure including a formed body (1) and solid particles (3) distributed on a surface of the formed body (1) by being externally added thereto, wherein the solid particles (3) are held on the surface of the formed body (1) in a form of being covered with a very small amount of an oily liquid (5), and an air layer (7) is present in gaps among the solid particles (3) that are close to the surface of the formed body (1).

18 Claims, 2 Drawing Sheets

(51) Int. Cl.
  *B65D 23/02* (2006.01)
  *B32B 17/06* (2006.01)
  *B32B 27/06* (2006.01)
  *B65D 1/02* (2006.01)
  *B65D 65/42* (2006.01)
  *B65D 85/72* (2006.01)

(52) U.S. Cl.
  CPC ......... *B65D 1/0207* (2013.01); *B65D 1/0246* (2013.01); *B65D 23/02* (2013.01); *B65D 65/42* (2013.01); *B65D 85/72* (2013.01); *B32B 2439/60* (2013.01)

(56) References Cited

U.S. PATENT DOCUMENTS

| | | |
|---|---|---|
| 2004/0142159 A1 | 7/2004 | Pallotta et al. |
| 2013/0032316 A1 | 2/2013 | Dhiman et al. |
| 2013/0034695 A1 | 2/2013 | Smith et al. |
| 2014/0147627 A1 | 5/2014 | Aizenberg et al. |
| 2014/0187666 A1 | 7/2014 | Aizenberg et al. |
| 2014/0290731 A1 | 10/2014 | Aizenberg et al. |
| 2014/0290732 A1 | 10/2014 | Aizenberg et al. |
| 2015/0108032 A1 | 4/2015 | Akutsu et al. |
| 2016/0039557 A1 | 2/2016 | Akutsu et al. |
| 2016/0152786 A1 | 6/2016 | Akutsu et al. |
| 2017/0130155 A1 | 5/2017 | Okada et al. |

FOREIGN PATENT DOCUMENTS

| | | |
|---|---|---|
| JP | 62-138130 A | 6/1987 |
| JP | 02-052792 A | 2/1990 |
| JP | 2004-230263 A | 8/2004 |
| JP | 2006-517872 A | 8/2006 |
| JP | 2009-241943 A | 10/2009 |
| JP | 2012-41049 A | 3/2012 |
| JP | 2014-231231 A | 12/2014 |
| JP | 2015-027887 A | 2/2015 |
| JP | 5673870 B1 | 2/2015 |
| JP | 2015-144739 A | 8/2015 |
| KR | 10-2007-0015122 A | 2/2007 |
| KR | 10-2015-0034178 A | 4/2015 |
| WO | 2005/063903 A1 | 7/2005 |
| WO | 2012/100099 A2 | 7/2012 |
| WO | 2013/022467 A2 | 2/2013 |
| WO | 2015/012358 A1 | 1/2015 |
| WO | 2015/194626 A1 | 12/2015 |

OTHER PUBLICATIONS

Communication dated Nov. 20, 2018, from the European Patent Office in counterpart European Application No. 16782904.3.
Masayuki Akutsu, et al., "Kinosei Biryushi o Hifuku shita HCO-10 Vesicle no Chosei", The 56$^{th}$ Divisional Meeting on Colloid and Interface Chemistry Koen Yoshishu, Aug. 22, 2003, pp. 173, 2D01.
Shin-Etsu Silicone, "Silicone Fluid KF-96 KF-96 Performance Test Results", <URL: https://www.shinetsusilicone-global.com/catalog/pdf/kf96_e.pdf>, Jun. 8, 2016, 36 pages.
International Search Report for PCT/JP2016/058708 dated Jun. 21, 2016 [PCT/ISA/210].

* cited by examiner

STRUCTURE HAVING SOLID PARTICLES DISTRIBUTED ON THE SURFACES THEREOF

CROSS REFERENCE TO RELATED APPLICATIONS

This application is a National Stage of International Application No. PCT/JP2016/058708 filed Mar. 18, 2016, claiming priority based on Japanese Patent Application No. 2015-089464 filed Apr. 24, 2015, the contents of all of which are incorporated herein by reference in their entirety.

TECHNICAL FIELD

This invention relates to a structure having solid particles distributed on the surfaces thereof. More specifically, the invention relates to a structure that can be favorably used as a container.

BACKGROUND ART

The containers for containing liquid contents must be capable of favorably discharging the contents irrespective of the materials forming the containers. Discharging the content is not almost of a problem when the liquids having low viscosities such as water and the like are contained. Discharging the content, however, becomes a serious problem when the content is a highly viscous substance such as mayonnaise or ketchup irrespective of the plastic container or the glass container. Namely, the contents of this kind are not quickly discharged despite the container is tilted. Besides, the contents tend to stay on the container wall and cannot be all recovered. Particularly, the content stays in considerable amounts on the bottom of the container and is not all recovered.

In recent years, there have been proposed various kinds of technical arts for improving slipping properties to viscous substances by forming a liquid film on the surfaces of the formed bodies such as containers and the like (e.g., see patent documents 1 and 2).

According to the above technical arts, the slipping property can be strikingly improved as compared to the cases of adding an additive such as lubricant to the synthetic resin that forms the surfaces of the formed bodies, and attention has now been paid thereto.

According to the above means for improving surface properties by forming the liquid film on the surfaces of the substrates as described above, however, the life for effectively exhibiting the slipping property relying on the oil film does not last long. After the passage of long periods of time, therefore, the slipping property decreases and, depending upon the cases, the content adheres to the surfaces. This tendency becomes conspicuous particularly when the substance that falls down along the surface is an emulsified product containing water like a mayonnaise-like food.

There has, further, been proposed an art in which a liquid layer is formed on the inner surface of a container by using a liquid that exhibits slipping property to the content, and liquid protuberances are so formed as to locally protrude on the surface of the liquid layer in an attempt to greatly improve the slipping property to the content. This art has been patented already (patent document 3).

Though the above art is satisfactory from the standpoint of sustaining the slipping property, however, the resin layer that serves as the underlying layer for the liquid layer must be blended with a finely granular surface-roughening agent in order to form liquid protuberances on the surface of the liquid layer. That is, the inner surface of the container for constituting the liquid protuberances is formed relying on the granular surface-roughening agent in the underlying resin layer. Therefore, it is very difficult to control the surface roughness and the production thereof involves difficulty. Besides, viscous substances and, specifically, foods such as mayonnaise and ketchup are not, usually, all discharged and all spent at one time, but are discharged and spent in small amounts each time. Therefore, a further improved slipping property is required for these foods.

Further, the present applicant has previously proposed a packing material having a liquid film formed on the inner surface thereof that comes in contact with the content, the liquid film being dispersed with solid particles of a particle size of not larger than 300 μm (Japanese Patent Application No. 2014-126877).

In the above art previously proposed by the present applicant, however, sustenance of the slipping property has not been evaluated at all.

PRIOR ART DOCUMENTS

Patent Documents

Patent document 1: WO2012/100099
Patent document 2: WO2013/022467
Patent document 3: Japanese Patent No. 5673870

OUTLINE OF THE INVENTION

Problems that the Invention is to Solve

It is, therefore, an object of the present invention to provide a structure having a surface that exhibits excellent slipping property to viscous water-containing substances and sustains the slipping property.

Another object of the present invention is to provide a structure having a surface that is formed by a simple means maintaining stability.

Means for Solving the Problems

The present inventors have forwarded the study concerning a structure forming, on the surface thereof, a liquid film in which solid particles are dispersed. As a result, the inventors have discovered that when the surface state of the liquid film satisfies some kinds of conditions, the surface exhibits excellent slipping property to viscous water-containing substances and, at the same time, sustains the slipping property to a greatly improved degree, and have thus completed the invention.

According to the present invention, there is provided a structure comprising a formed body and solid particles distributed on a surface of the formed body by being externally added thereto, wherein the solid particles are held on the surface of the formed body in a form of being covered with a very small amount of an oily liquid, and an air layer is present in gaps among the solid particles that are close to the surface of the formed body.

In this specification, the formed body stands for a formed body to which the solid particles have not been externally added, and the structure stands for a structure comprising the formed body to which the solid particles have been externally added. Namely, the formed body has no solid particles on the surface thereof whereas the structure has solid particles on the surface thereof.

In the structure of the present invention, it is desired that:
(1) The solid particles have a particle size of not more than 100 μm and are distributed on the surface of the formed body in an amount of 0.01 to 0.2 mg/cm²;
(2) The solid particles are particles of vegetable fat and oil;
(3) The oily liquid acquires a contact angle (20° C.) of not more than 45° relative to the surface of the formed body and has a viscosity (25° C.) of not more than 100 mPa·s;
(4) The oily liquid is an edible oil;
(5) The solid particles are present on the surface of the formed body in an amount of 0.5 to 20 parts by mass per 100 parts by mass of the oily liquid;
(6) The surface of the formed body is formed of a synthetic resin or a glass;
(7) The formed body is a container, and the solid particles are distributed on an inner surface thereof that comes into contact with a content; and
(8) The container is used for containing a fluid content that has a viscosity (25° C.) of not less than 1260 mPa·s.

Effects of the Invention

The surface structure specific to the structure of the present invention is formed by holding the solid particles that are externally added on the surface of the formed body of a predetermined shape (e.g., on an inner surface of a container) by using a very small amount of oily liquid. That is, the surface structure is not formed by internally adding the solid particles in the resin layer that forms the surface of the formed body. It is, therefore, allowed to easily and reliably control the surface state (degree of ruggedness due to the solid particles and distribution thereof) depending on the size of the solid particles and the amount of use thereof.

Besides, due to its specific surface structure, the structure of the present invention not only exhibits its excellent slipping property to the viscous water-containing substances but also exhibits its slipping property even to emulsified products such as mayonnaise-like food over extended periods of time.

Therefore, when used as a container for containing, specifically, viscous water-containing substances such as ketchup and mayonnaise-like food having a viscosity (25° C.) of not less than 1260 mPa·s, the structure of the invention makes it possible to quickly discharge the contents, allows the contents to stay very little in the container, and enables the contents to be used in almost all amount.

MODES FOR CARRYING OUT THE INVENTION

Figure 1:
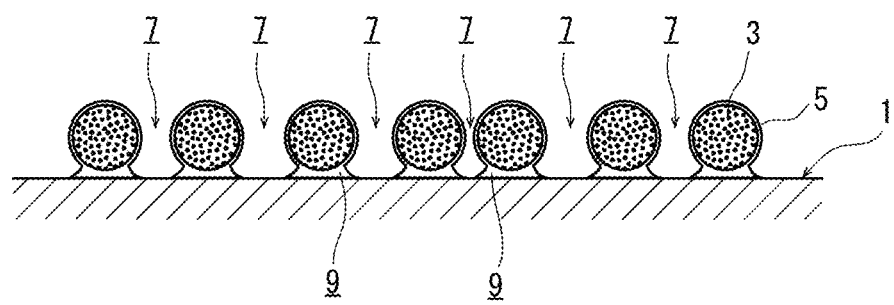
FIG. 1 It is a schematic side sectional view illustrating the surface state of a structure of the present invention.

Referring to FIG. 1, the structure of the present invention includes a formed body 1 formed in a shape that meets the use and solid particles 3 distributed on the surface thereof, the solid particles 3 being covered with a very small amount of an oily liquid 5 and being held on the surface of the formed body 1.

<Principle of Expressing Slipping Property>

In the above structure 1, what is particularly important is that an air layer 7 is present in the gaps among the solid particles 3 that are close to the surface of the formed body 1. This surface structure not only exhibits its excellent slipping property to viscous water-containing substances but also excellently sustains the property.

That is, the viscous water-containing substance moves on the solid particles 3 that are covered with a very small amount of the oily liquid 5 and, accordingly, comes in contact with the oily liquid 5 and, at the same time, with the air layer 7 among the solid particles 3. The oily liquid 5 is water-repellent. Here, at the same time, the air is more water-repellent than the oily liquid. As a result, the structure of the present invention exhibits a greatly improved slipping property to the viscous water-containing substances.

As the oily liquid 5 and the solid particles 3 split off the surface accompanying the repetition of flow of the viscous water-containing substance, the slipping property gradually decreases, as a matter of course.

According to the present invention, however, the solid particles 3 are covered with a very small amount of the oily liquid 5 which, therefore, is forming a layer of only a very small thickness. Besides, the solid particles 3 are firmly held on the surface of the formed body 1 due to the presence of the oily liquid 5 that is confined in very small spaces between the solid particles 3 and the formed body 1. Therefore, despite the viscous water-containing substance flows repetitively, the oily liquid 5 and the solid particles 3 decrease in very small amounts. Besides, the air layer 7 among the solid particles 3 which serves as a major factor of greatly improving the slipping property remains almost all unchanged. In the present invention, therefore, the above-mentioned excellent slipping property is sustained and is effectively prevented from decreasing despite of the passage of time.

If, for example, the amount of the oily liquid 5 is too large and no air layer 7 is formed among the solid particles 3, then improved slipping property due to the air layer 7 is not exhibited or the slipping property becomes insufficient. Moreover, as the viscous water-containing substance flows on the oily liquid 5, the oily liquid 5 is scraped off. At the same time, the solid particles 3, too, are removed, and sustenance of the slipping property becomes very unsatisfactory.

The mechanism for expressing the slipping property of the structure of the present invention described above may resemble the invention disclosed in the patent document 3 that was patented already, but in practice is clearly different therefrom.

In the patent document 3, the surface is formed rugged due to the solid particles internally added into the resin layer that forms the surface, and an oil film of a very small thickness is formed thereon such that the ruggedness is reflected on the surface of the oil film. Namely, the slipping property is expressed by the oil film having such a rugged surface. At a glance, it may appear that the slipping property is expressed by the mechanism which is the same as that of the present invention. In the patent document 3, however, the ruggedness is formed by the solid particles that are internally added into the resin layer. Therefore, the density or the degree of ruggedness is very small and, specifically, the numerical density of protuberances is small. In the patent document 3, therefore, the air layer present among the neighboring protuberances is not utilized for expressing the slipping property. Instead, the contact area is decreased due to the ruggedness between the substance flowing on the surface and the underlying surface, and whereby the frictional force is decreased to the substance flowing on the surface in order to improve the slipping property. That is, the ruggedness that affects the slipping property is formed by internally adding the solid particles, accounting for a difficulty in controlling the degree of ruggedness.

In the present invention in which the solid particles 3 are externally added, it is easy to control the size of the air layer 7 among the solid particles relying on the size of the solid particles 3 and on the amount of use thereof.

Figure 3:
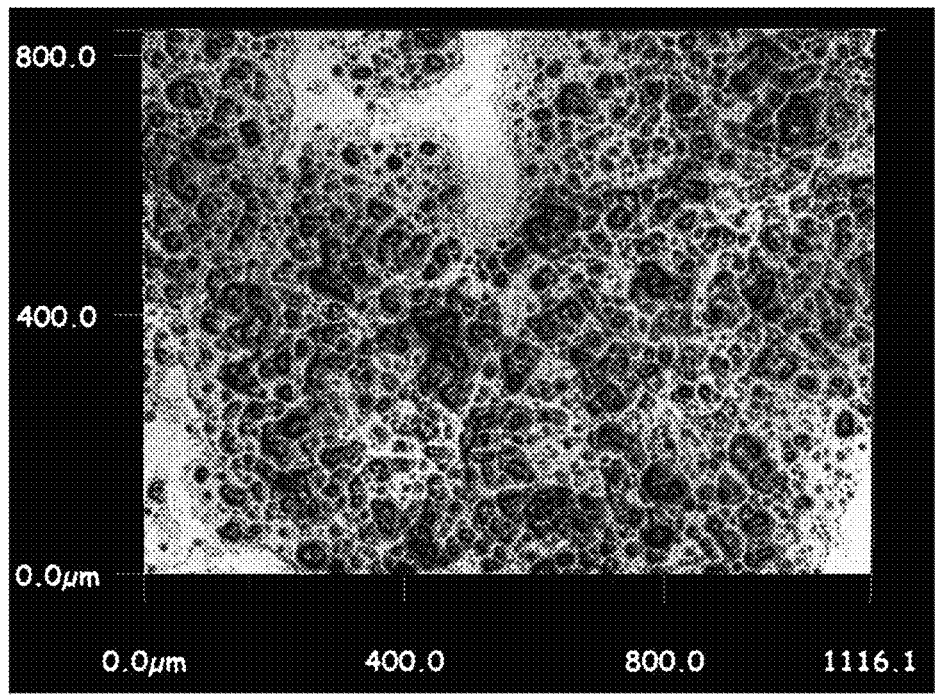
FIG. 3 It is a view showing the results of when the surface of the structure of Example 1 is observed by using a digital microscope.

The presence of the air layer 7 can be confirmed through the observation by using a microscope as shown in FIG. 3 and by measuring the water contact angle. For example, the water contact angle (3 μL) is 73.2 degrees on the structure in Example 1 of the present invention, which is a value smaller than the water contact angle (3 μL) of 80.3 degrees on a smooth liquid film. This fact proves that on the structure of the present invention, the solid particles 3 are held by the oily liquid 5 of a very small amount and that the air is present among the solid particles 3. That is, if spaces among the solid particles 3 are filled with the oily liquid 5, then the water contact angle on the surface thereof would be the same as the water contact angle on the smooth liquid film. In the present invention, however, the water contact angle is becoming obviously small. This, therefore, is proving the fact that not the oily liquid 5 but the air is present among the solid particles 3. A ratio of the water contact angle on the structure to the water contact angle on the smooth liquid film is a so-called roughness factor r that is represented by the following formula (1), and stands for a degree of contact of water to the air in the structure.

$$r = \cos\theta_A / \cos\theta_B \quad (1)$$

wherein, $\theta_A$ is water contact angle on the surface of the structure, and $\theta_B$ is water contact angle on the smooth oily liquid 5.

<Formed Body 1>

There is no particular limitation on the material of the formed body 1 so far as it is capable of holding the solid particles 3 on the surface thereof by using the oily liquid 5. Namely, the formed body 1 may be made of an arbitrary material such as a resin, a glass or a metal and may be formed in any shape to meet the use.

Specifically, from such a standpoint that the structure of the invention exhibits excellent slipping property to viscous water-containing substances, it is desired that the formed body 1 has the shape of a pipe for flowing the water-containing substances, a container for containing them, a container lid, and the like. By using the oily liquid 5, the solid particles 3 are held on the surface that comes into contact with the water-containing substances.

Besides, from the standpoint of holding the solid particles 3 by using the oily liquid 5, it is most desired that the surface of the formed body 1 is made of a synthetic resin.

The synthetic resin (hereinafter referred to as underlying resin) may be any thermoplastic resin or thermosetting resin capable of being formed. In general, however, it is desired that the underlying resin is a thermoplastic resin from such a standpoint that it can be easily formed, it has a high degree of affinity to the oily liquid 5, and it is capable of more stably holding the solid particles 3 by using the oily liquid 5.

As the thermoplastic resin, there can be exemplified the following resins; i.e., olefin resins such as low-density polyethylene, high-density polyethylene, polypropylene, poly(1-butene), poly (4-methyl-1-pentene), and random or block copolymers of α-olefins such as ethylene, propylene, 1-butene or 4-methyl-1-pentene, and cyclic olefin copolymers;

ethylene-vinyl copolymers such as ethylene-vinyl acetate copolymer, ethylene-vinyl alcohol copolymer and ethylene-vinyl chloride copolymer;

styrene resins such as polystyrene, acrylonitrile-styrene copolymer, ABS and α-methylstyrene-styrene copolymer;

vinyl resins such as polyvinyl chloride, polyvinylidene chloride, vinyl chloride-vinylidene chloride copolymer, poly (methyl acrylate) and poly(methyl methacrylate);

polyamide resins such as nylon 6, nylon 6-6, nylon 6-10, nylon 11 and nylon 12;

polyester resins such as polyethylene terephthalate (PET), polybutylene terephthalate, polyethylene naphthalate and copolymerized polyesters thereof;

polycarbonate resin;

polyphenylene oxide resin; and biodegradable resins such as polylactic acid.

As a matter of course, it is also allowable to use a blend of the above thermoplastic resins as the underlying resin so far as it does not impair the formability.

In the invention, among the above thermoplastic resins, it is desired to use an olefin resin and a polyester resin that have been used as materials of containers for containing viscous contents, and it is most desired to use the olefin resin.

That is, as compared to the polyester resin such as PET, the olefin resin has a low glass transition temperature (Tg) and shows a high molecular mobility at room temperature. Therefore, the oily liquid 5 partly infiltrates into the interior of the olefin resin, and the interface between the oily liquid 5 and the olefin resin becomes ambiguous (or an interface of a certain thickness is formed) lending itself best suited for stably holding the solid particles 3 on the surface via the oily liquid 5.

Further, it can be usually presumed that, as the time passes by, the oily liquid diffuses into the polyolefin resin which is in a rubbery state at room temperature and excellent slipping property may extinguish. In the present invention, however, the diffusion is effectively suppressed. Despite the polyolefin resin is used as the underlying resin, therefore, excellent slipping property is exhibited continuously. In the present invention, the solid particles 3 are held on the surface of the formed body 1 via the oily liquid 5. In this case, the oily liquid 5 is made present in very small spaces 9 formed between the surface of the formed body 1 and the solid particles 3. Therefore, a negative Laplace pressure is produced in the oily liquid 5 depending on the shape of the very small spaces 9, and the oily liquid 5 forms therein a reduced pressure environment in which the pressure is lower than that of the surroundings. As a result, despite the polyolefin resin is used as the underlying resin of the structure 1, it is presumed that the oily liquid 5 stays in the very small spaces since it is in the reduced pressure environment, and the oily liquid is suppressed from diffusing into the polyolefin resin.

Moreover, the olefin resin is highly flexible and has been used for producing squeeze-out containers (squeeze bottles) by the direct blow-forming method that will be described later. Therefore, use of the olefin resin is desirable even from the standpoint of applying the structure of the present invention to the containers of this kind.

The formed body 1 may be of a single-layer structure of the thermoplastic resin as described above, or a laminate of the thermoplastic resin with a paper, or may be of a multi-layer structure of a combination of a plurality of thermoplastic resins.

The structure of the present invention exhibits excellent slipping property to viscous water-containing substances and sustains the slipping property. The structure, therefore, can be effectively applied to the use where it comes into contact with the water-containing substances and can be, specifically, used as containers for containing water-containing substances to enjoy the advantage of the present invention to a maximum degree.

Specifically, when the formed body 1 assumes the form of a container with its inner surface being formed of an olefin resin or a polyester resin, there can be employed a structure in which an oxygen-barrier layer or an oxygen-absorbing layer is laminated as an intermediate layer via an adhesive resin layer as appropriate and, further, the same resin as the underlying resin (olefin resin or the polyester resin) forming the inner surface is laminated on the outer surface side thereof.

The oxygen-barrier layer in the multi-layer structure is formed by using an oxygen-barrier resin such as ethylene-vinyl alcohol copolymer or polyamide, and can be, further, blended with any other thermoplastic resins in addition to the oxygen-barrier resin so far as they do not impair the oxygen-barrier property.

Further, as described in JP-A-2002-240813, the oxygen-absorbing layer contains an oxidizable polymer and a transition metal catalyst. Due to the action of the transition metal catalyst, the oxidizable polymer is oxidized with oxygen thereby absorbing oxygen and prevents the permeation of oxygen. The above oxidizable polymer and the transition metal catalyst have been closely described in the above JP-A-2002-240813. Therefore, though not described here in detail, representative examples of the oxidizable polymer include an olefin resin having tertiary carbon atoms (e.g., polypropylene, polybutene-1, or a copolymer thereof), thermoplastic polyester or an aromatic polyamide; a polyamide resin containing a xylylene group; and an ethylenically unsaturated group-containing polymer (e.g., polymer derived from a polyene such as butadiene). Further, representative examples of the transition metal catalyst include inorganic salts of transition metals such as iron, cobalt and nickel, organic salts or complex salts.

The adhesive resins used for adhering the layers have been known. As the adhesive resins, for instance, there can be used an olefin resin graft-modified with a carboxylic acid such as maleic acid, itaconic acid, fumaric acid, or an anhydride thereof, amide or ester; an ethylene-acrylic acid copolymer; an ionically crosslinked olefin copolymer; and an ethylene-vinyl acetate copolymer.

The layers may have thicknesses that are suitably determined depending upon the properties required for the layers.

It is, further, allowable to form, as the inner layer, a layer of the reground resin obtained by blending a virgin resin such as olefin resin with a scrap resin such as burr that generates in forming the body 1 of the multi-layer structure. Or it is also allowable to obtain a container of which the inner surface is formed by using the olefin resin or the polyester resin and of which the outer surface is formed by using the polyester resin or the olefin resin.

There is no particular limitation on the shape of the container which, therefore, may assume any shape depending on the material of the container, such as cup, bottle, bag (pouch), syringe, pot or tray. The container can be stretch-formed or can be formed by any known method.

Figure 2:
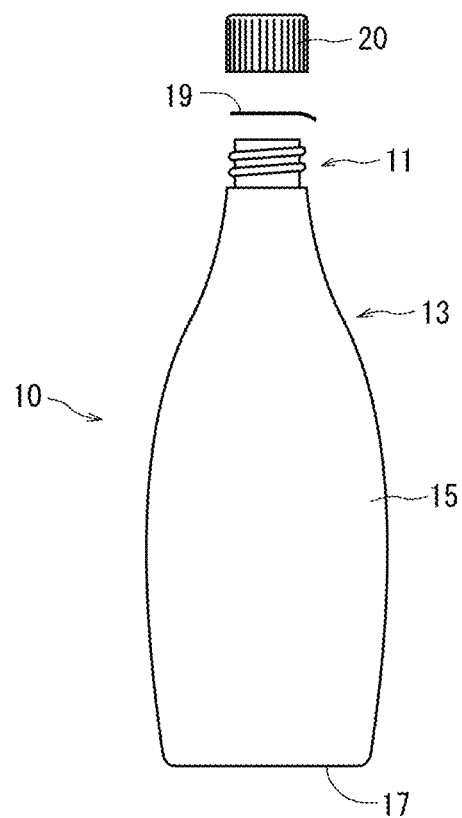
FIG. 2 It is a view showing the state of a directly blow-formed bottle which is a preferred embodiment of the structure of the present invention.

FIG. 2 shows a directly blow-formed bottle which is the most preferred embodiment of the formed body 1 of the present invention.

In FIG. 2, the bottle generally designated at 10 includes a neck portion 11 having a screw thread, a body wall 15 continuous to a neck portion 11 via a shoulder portion 13, and a bottom wall 17 that is closing the lower end of the body wall 15. The solid particles 3 are held on the inner surface of the bottle by the oily liquid 5.

The bottle 10 is favorably used for containing viscous substances. Upon squeezing the body wall 15, the viscous substance contained therein can be discharged. Due to the improved slipping property to the content and sustenance thereof, the content can be quickly discharged and in all amounts so that the content can be all consumed.

<Solid Particles 3>

The solid particles 3 used in the present invention are externally added to the surface of the formed body 1, form ruggedness on the surface thereof, form an air layer 7 among the protuberances (among the solid particles), and contribute to improving the slipping property.

It is desired that the solid particles 3 have particle size of not more than 100 μm and, specifically, in a range of 5 to 80 μm and, particularly, 5 to 30 μm. The solid particles having too large particle size tend to easily fall down due to their own weights and become difficult to be held on the surface by using the oily liquid 5 in a very small amount. On the other hand, the solid particles having too small particle size are not capable of forming the air layer 7 of a thickness large enough for improving the slipping property and, besides, tend to be aggregated together. In this case, too, therefore, the solid particles cannot be easily held on the surface by the oily liquid 5 of a very small amount.

The particle size can be measured by, for example, a laser diffraction/scattering method or by the observation using a microscope, and stands for the so-called secondary particle size (size of aggregated particles).

In the present invention, the solid particles 3 may be formed by using a variety of organic materials or inorganic materials. From the standpoint of good affinity to the oily liquid 5 and being easily held on the surface by the oily liquid 5 of a very small amount, however, the solid particles 3 should be rather the organic particles than the inorganic particles such as metal particles or metal oxide particles. For instance, the solid particles 3 should preferably be those of olefin wax, rice wax, carnauba wax, various celluloses or cured organic resin (e.g., cured product obtained by curing a polyfunctional acrylic monomer) and should, most desirably, be particles of vegetable fat and oil such as rice wax from such a standpoint that they can be used for foods without any limitation.

The solid particles 3 are distributed on the surface of the formed body 1 in an amount of 0.01 to 0.2 mg/cm$^2$ and, specifically, 0.05 to 0.1 mg/cm$^2$. If the amount of distribution is too large, the gaps become too small among the neighboring solid particles 3 and it becomes difficult to effectively form the air layer 7 that contributes to the slipping property. If the amount of distribution is too small, on the other hand, the gaps become too large among the solid particles 3. When the viscous water-containing substance flows on the surface, therefore, the air layer 7 does not effectively work; i.e., the substance flows in direct contact with the surface of the structure 1, and the slipping property cannot be exhibited to a sufficient degree. As described above, when it is desired to express the slipping property to a sufficient degree, the solid particles 3 should be distributed on the surface of the structure at a density of 400 to 40,000 particles/mm$^2$ and, specifically, 2,000 to 10,000 particles/mm$^2$.

<Oily Liquid 5>

The oily liquid 5 is present in very small spaces formed between the surface of the formed body 1 and the solid particles 3, works to stably hold the solid particles 3 on the surface of the formed body 1, and, due to its water repellency, exhibits slipping property to water-containing substances and, further, work as an agent for holding the solid particles 3 and as a lubricating agent. The mechanism why the solid particles can be held on the surface of the formed body 1 by the oily liquid 5 has not been completely clarified yet. Here, however, the oily liquid 5 is made present in very small spaces 9 present between the solid particles 3 and the formed body 1 producing a Laplace pressure due to the oily liquid 5 between the solid particles 3 and the formed body 1. It is, therefore, presumed that the negative Laplace pressure (i.e., attractive force between the solid particles 3 and the formed body 1) works to hold the solid particles 3 on the surface of the formed body 1.

The oily liquid must be a nonvolatile liquid having a small vapor pressure under the atmospheric pressure or must be a high-boiling liquid having a boiling point of, for example, not lower than 200° C. This is because if a volatile liquid is used, then the liquid easily volatilizes and extinguishes with the passage of time.

Further, the liquid must be the high-boiling liquid as described above, must be highly wettable to the surface of the formed body 1 and must be capable of stably holding the solid particles 3 in a manner of being closely adhered to the surface of the formed body 1. From these points of view, the oily liquid must acquire a contact angle (20° C.) of not more than 45 degrees with respect to the surface of the formed body 1 and must have a viscosity (25° C.) of not more than 100 mPa·s. Namely, irrespective of a synthetic resin, a glass or a metal that is forming the surface of the formed body 1, the solid particles 3 can be effectively held on the surface of the formed body 1 by using the oily liquid that satisfies the above-mentioned properties.

Further, from the standpoint of improving the sliding property to viscous water-containing substances, it is desired to use an oily liquid having a surface tension lying in a range of 10 to 40 mN/m and, specifically, 16 to 35 mN/m. This is because, as the surface tension becomes greatly different from that of the water-containing substance for which the slipping property is to be exhibited, more increased lubricating effect can be exhibited.

As the oily liquid 5 that satisfies the conditions concerning the contact angle, viscosity and surface tension, there can be representatively exemplified liquid paraffin, synthetic paraffin, fluorine-containing liquid, fluorosurfactant, silicone oil, fatty acid triglyceride and various vegetable oils. An edible oil is preferred particularly when the substances for which the slipping property is to be exhibited are foods (such as mayonnaise or ketchup).

Concrete examples of the edible oil include soy bean oil, rape oil, olive oil, rice oil, corn oil, safflower oil, sesame oil, palm oil, castor oil, avocado oil, coconut oil, almond oil, walnut oil, hazel oil and salad oil.

In the present invention, the solid particles 3 are used in an amount of, desirably, 0.5 to 20 parts by mass and, specifically, 3 to 10 parts by mass per 100 parts by mass of the oily liquid 5. If the oily liquid 5 is used in too large amounts, the gaps among the solid particles 3 are completely filled with the oily liquid 5 and make it difficult to form the air layer 7 in a thickness large enough to contribute to exhibiting the slipping property. Besides, as the viscous water-containing substance flows thereon, the oily liquid 5 is scratched off by the water-containing substance. At the same time, the solid particles 3, too, are scratched off causing the slipping property to be no longer sustained. Further, if the oily liquid 5 is used in a small amount, it becomes difficult to stably hold the solid particles 3 on the surface of the formed body 1. In this case, too, the slipping property decreases and can no longer be sustained.

<Holding the Solid Particles 3 by the Oily Liquid 5>

In the invention, to hold the solid particles 3 on the surface of the formed body 1 by using the above-mentioned oily liquid 5, a coating solution containing the solid particles 3 dispersed therein is prepared by mixing the oily liquid 5 and the solid particles 3 together so as to satisfy the amounts mentioned above. The coating solution is then applied to the surface of the formed body 1. Any known coating means can be employed depending on the shape of the surface of the formed body 1, such as spray coating, knife coating or roll coating. Preferably, however, the spraying method is employed since it makes easy to adjust the amount of distribution of the solid particles 3.

As described earlier, it is presumed that holding the solid particles 3 by the oily liquid 5 is due to the negative Laplace pressure. To increase the holding force (i.e., Laplace pressure), it is desired that the particle size of the solid particles 3 is set to lie in the range described earlier.

The above-mentioned structure of the present invention exhibits excellent slipping property to the viscous water-containing substances and sustains the slipping property. Therefore, the structure can be preferably used as a container for containing a viscous water-containing substance having a viscosity (25° C.) of not less than 100 mPa·s and, specifically, as a directly blow-formed container for containing viscous contents such as mayonnaise, ketchup, aqueous paste, honey, various sauces, mustard, dressing, jam, chocolate syrup, cosmetic such as milky lotion, liquid detergent, shampoo, rinse, etc.

EXAMPLES

The invention will now be described by way of the following Experimental Examples.

Described below are various kinds of properties, methods of measuring the properties, and resins used for forming the resin formed bodies (containers) employed in the following Examples.

1. Observation of the Surface Shape of the Structure.

A test piece measuring 20 mm×20 mm was cut out from the body portion of a multi-layer container prepared by a method described later, the surface state of the inside of the test piece was observed by using a digital microscope (VHX-1000, manufactured by KEYENCE CORPORATION), and the three-dimensional image thereof was measured. From the obtained image, there were found a maximum difference in the height on the measured surface and a numerical density of protuberances per 1 mm$^2$.

2. Test of the Slipping Property to the Content (Observation of the Slipping Behavior).

The multi-layer container prepared by the method described later was filled with 100 g of a content which was a mayonnaise-like food in a customary manner. The mouth portion of the bottle was heat-sealed with an aluminum foil and was sealed with a cap to obtain a filled bottle. The bottle filled with the content was tilted to observe the slipping behavior with the eye. The faster the motion of the content, the better the slipping property.

3. Test of the Slipping Property After Storage.

The multi-layer container prepared by the method described later was filled with 400 g of a content which was a mayonnaise-like food in a customary manner. The mouth portion of the bottle was heat-sealed with the aluminum foil and was sealed with the cap to obtain a filled bottle.

The obtained filled bottle was stored for periods of time and at temperatures shown in Table 1. Thereafter, the heat-sealing member was peeled off, and the bottle fitted with the cap was pushed at its body portion to squeeze the content through the mouth portion of the bottle until it was not left any more. Next, the air was introduced into the bottle to restore its shape.

Next, the bottle was inverted (mouth portion down) and was stored for one hour. Thereafter, the body wall of the bottle was measured in regard to what extent the content has slipped down along the bodywall of the bottle (to what extent the content has no longer been adhered to the body wall). The content adhesion ratio was calculated in compliance with the following formula.

Content adhesion ratio (%)=(surface area on which the content adhered/surface area of the body wall of the bottle)×100

From the content adhesion ratios calculated above, the slipping properties were evaluated on the following basis.
○: The content adhesion ratio is less than 10%.
Δ: The content adhesion ratio is not less than 10% but is less than 50%.
x: The content adhesion ratio is not less than 50%.
The lower the content adhesion ratio, the better the content slipping property after the storage.

<Content>

An egg (50 g), 15 cc of vinegar and 2.5 cc of salt were mixed together and to which 150 cc of edible oil was, further, added to prepare a mayonnaise-like food for experiment. In Examples and Comparative Examples, the contents were prepared in required amounts and were used.

Example 1

There was provided a multi-layer directly blow-formed bottle having a multi-layer structure of the following layer constitution and a capacity of 400 g.
Inner layer: low-density polyethylene resin (LDPE)
Intermediate layer: ethylene-vinyl alcohol copolymer (EVOH)
Outer layer: low-density polyethylene resin (LDPE)
Adhesive layers (among the inner layer, outer layer and intermediate layer): acid-modified polyolefin Next, in 100 g of an oily liquid (salad oil to which an medium-chain fatty acid was added, viscosity of 33 mPa·s (25° C.)), there were finely dispersed 5 g of solid particles (carnauba wax) by using a homogenizer to prepare a coating liquid which was then uniformly applied onto the inner surface of the container by using an air sprayer. The amount of application was 1.97 g/cm². The thus prepared bottle was observed for its surface shape of the structure, and was tested for its slipping property to the content (slipping behavior was observed) and for its slipping property to the content after storage. The results were as shown in Tables 1 and 2. FIG. 3 shows the results obtained by observing the surface shape of the structure.

Examples 2 to 6

Bottles were prepared by applying the dispersion solution onto the inner surfaces of the containers in the same manner as in Example 1 but changing the ratios of the oily liquid and the solid particles, and the amount of application as shown in Table 1. The bottles were tested for their slipping property to the content (slipping behavior was observed) and for their slipping property to the content after storage. The results were as shown in Tables 1 and 2.

Comparative Example 1

A bottle was prepared by applying the oily liquid to the inner surface of the container in the same manner as in Example 1 but using, as the coating solution, an oily liquid that contained no solid particle. The bottle was tested for its slipping property to the content (slipping behavior was observed) and for its slipping property to the content after storage. The results were as shown in Tables 1 and 2.

Comparative Example 2

There was provided a resin composition of the following components for forming the underlying layer:
Low-density polyethylene (LDPE): 94 parts by weight,
Additive for roughening the surface: 1 part by weight, crosslinked poly(methyl methacrylate (average particle size=20 μm),
Liquid for forming the liquid layer: 5 parts by weight, medium-chain fatty triglyceride (MCT).

The resin composition for forming the underlying layer was fed into a 40-mm extruder, the maleic anhydride-modified polyethylene was fed as the resin for forming adhesive layers into a 30-mm extruder A, the ethylene-vinyl alcohol copolymer was fed as the resin for forming the intermediate layer into a 30-mm extruder B, and the low-density polyethylene was fed as the resin for forming the substrate into a 50-mm extruder. A molten parison was extruded through a multi-layer die head heated at a temperature of 210° C. and was directly blow-formed in a mold of a temperature of 20° C. into a container of a multi-layer structure having a capacity of 500 g and weighing 20 g.

By using the thus prepared multi-layer structure or the container, various measurements were taken in the same manner as in Example 1. The results were as shown in Tables 1 and 2.

The containers had a layer constitution in which the liquid layer was on the inner surface as follows:
Liquid layer/underlying layer (80)/adhesive layer (10)/intermediate layer (20)/adhesive layer (10)/substrate (300)
Total thickness (420).

Comparative Example 3

There was provided a resin composition of the following components for forming the underlying layer:
Low-density polyethylene (LDPE): 94 parts by weight,
Additive for roughening the surface: 3 parts by weight, crosslinked poly(methyl methacrylate) (average particle size=20 μm),
Liquid for forming the liquid layer: 5 parts by weight, medium-chain fatty triglyceride (MCT).

Figure 4:
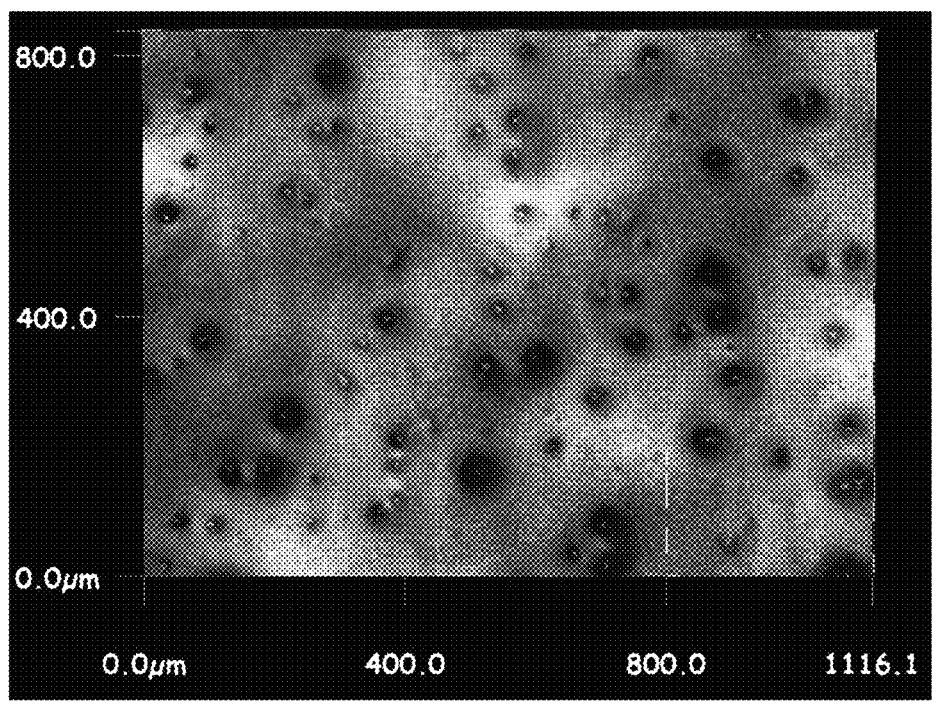
FIG. 4 It is a view showing the results of when the surface of a structure of Comparative Example 3 is observed by using the digital microscope.

A container of a multi-layer structure was prepared in the same manner as in Comparative Example 2 but using the above resin composition for forming the underlying layer. By using the thus prepared container, various measurements were taken in the same manner as in Comparative Example 2. The results were as shown in Tables 1 and 2. FIG. 4 shows the results obtained from the observation of the surface shape of the structure.

The container had a layer constitution in which the liquid layer was on the inner surface as follows:

Liquid layer/underlying layer (80)/adhesive layer (10)/intermediate layer (20)/adhesive layer (10)/substrate (350)

Total thickness (470).

TABLE 1

| | Composition of coating solution (wt/wt) | | Amount of application mg/cm² | Distributed amount of solid particles mg/cm² | Surface shape measurement | |
|---|---|---|---|---|---|---|
| | Solid particles | Oily liquid | | | Maximum difference of height | Numerical density of protuberances per mm² |
| Example 1 | 5 | 100 | 1.97 | 0.10 | 19.8 μm | 2872.3 |
| Example 2 | 3 | 100 | ↑ | 0.06 | 15.2 μm | 3325.8 |
| Example 3 | 1 | 100 | ↑ | 0.02 | — | — |
| Example 4 | 10 | 100 | ↑ | 0.20 | — | — |
| Example 5 | 0.5 | 100 | ↑ | 0.01 | — | — |
| Example 6 | 20 | 100 | 1.00 | 0.20 | — | — |
| Comp. Ex. 1 | 0 | 100 | 1.97 | — | — | — |
| Comp. Ex. 2 | — | — | — | — | 15.6 μm | 44.7 |
| Comp. Ex. 3 | — | — | — | — | 16.7 μm | 80.4 |

In Table, "—" means that it corresponds to nothing or there is no experimental data.

TABLE 2

Test of the content slipping property

| | Slipping behavior | Evaluation with the passage of time | | |
|---|---|---|---|---|
| | | Group of 23° C., one week | Group of 40° C., two weeks | Group of 40° C., two months |
| Ex. 1 | moves very fast | ○ | ○ | ○ |
| Ex. 2 | moves very fast | ○ | ○ | ○ |
| Ex. 3 | moves fast | ○ | ○ | ○ |
| Ex. 4 | moves fast | ○ | ○ | ○ |
| Ex. 5 | moves fast | ○ | ○ | Δ |
| Ex. 6 | moves fast | ○ | ○ | ○ |
| Comp. Ex. 1 | moves very fast | ○ | Δ | X |
| Comp. Ex. 2 | moves | ○ | ○ | ○ |
| Comp. Ex. 3 | moves | ○ | ○ | ○ |

From Tables 1 and 2, it is learned that in Examples 1 to 4 in which the solid particles are distributed on the inner surface of the bottle by external addition and are held on the inner surface of the bottle by the oily liquid, slipping properties of high degrees are exhibited as compared to Comparative Examples 2 and 3 in which ruggedness is formed on the inner surface of the bottle by internal addition of the solid particles and a very thin oil film is formed thereon such that the ruggedness is reflected on the surface. Measurement of the surface shapes tells that when the solid particles are distributed by external addition, numerical densities of protuberances are very larger than those of when the ruggedness is formed by internal addition (Comparative Examples 2 and 3). It is considered that the above difference is appearing as a difference in the slipping behavior.

In Comparative Example 1 in which the surface is covered with the oily liquid only without using solid particles, the initial slipping property is very high but decreases at high temperatures as the time passes by. In Examples 1 to 4 in which the solid particles are distributed and are held by the oily liquid, on the other hand, a high degree of slipping property can be maintained for extended periods of time even after the passage of time at high temperatures.

DESCRIPTION OF REFERENCE NUMERALS

1: formed body
3: solid particles
5: oily liquid
7: air layer

The invention claimed is:

1. A structure comprising a formed body and solid particles distributed on a surface of said formed body by being externally added thereto, wherein said solid particles are held on the surface of said formed body in a form of being covered with a very small amount of an oily liquid, and an air layer is present in gaps among the solid particles that are close to the surface of said formed body.

2. The structure according to claim 1, wherein said solid particles are present on the surface of said formed body in an amount of 0.5 to 20 parts by mass per 100 parts by mass of said oily liquid.

3. The structure according to claim 1, wherein the surface of said formed body is formed of a synthetic resin or a glass.

4. The structure according to claim 1, wherein said solid particles have a particle size of not more than 100 μm and are distributed on the surface of said formed body in an amount of 0.01 to 0.2 mg/cm².

5. The structure according to claim 4, wherein said solid particles are particles of vegetable fat and oil.

6. The structure according to claim 1, wherein said oily liquid acquires a contact angle (20° C.) of not more than 45° relative to the surface of the formed body and has a viscosity (25° C.) of not more than 100 mPa·s.

7. The structure according to claim 6, wherein said oily liquid is an edible oil.

8. The structure according to claim 1, wherein said formed body is a container, and said solid particles are distributed on an inner surface thereof that comes into contact with a content.

9. The structure according to claim 8, wherein said container is used for containing a fluid content that has a viscosity (25° C.) of not less than 1260 mPa·s.

10. A structure comprising a formed body and solid particles distributed on a surface of said formed body by being externally added thereto, wherein said solid particles are held on the surface of said formed body in a form of being covered with a very small amount of an oily liquid, and an air layer is present in gaps among the solid particles that are close to the surface of said formed body, and said oily liquid is present exclusively on the surfaces of said solid particles and in very small spaces between said solid particles and the formed body, while regions not covered with the oily liquid are formed among said solid particles.

11. The structure according to claim 10, wherein said solid particles are present on the surface of said formed body in an amount of 0.5 to 20 parts by mass per 100 parts by mass of said oily liquid.

12. The structure according to claim 10, wherein the surface of said formed body is formed of a synthetic resin or a glass.

13. The structure according to claim 10, wherein said solid particles have a particle size of not more than 100 μm and are distributed on the surface of said formed body in an amount of 0.01 to 0.2 mg/cm$^2$.

14. The structure according to claim 13, wherein said solid particles are particles of vegetable fat and oil.

15. The structure according to claim 10 wherein said oily liquid acquires a contact angle (20° C.) of not more than 45° relative to the surface of the formed body and has a viscosity (25° C.) of not more than 100 mPa·s.

16. The structure according to claim 15, wherein said oily liquid is an edible oil.

17. The structure according to claim 10, wherein said formed body is a container, and said solid particles are distributed on an inner surface thereof that comes into contact with a content.

18. The structure according to claim 17, wherein said container is used for containing a fluid content that has a viscosity (25° C.) of not less than 1260 mPa·s.

* * * * *